Patented July 30, 1940

2,209,624

UNITED STATES PATENT OFFICE 2,209,624

GLAZING CERAMIC WARE

Benjamin A. Jeffery, Clarkston, Mich., assignor, by mesne assignments, to Champion Spark Plug Company, Toledo, Ohio, a corporation of Delaware (1938)

No Drawing. Application August 5, 1937, Serial No. 157,527

4 Claims. (Cl. 25—156)

This invention relates to glazing ceramic ware, and more particularly to the glazing of dry-pressed ware.

The object of the invention is to provide such ware with a glaze without incurring difficulties because of the penetration of the glaze-suspending liquid into the body of the article.

For making articles of ceramic material which are very uniform in composition, structure and density and which will maintain their shape with exactness during firing, it has been found quite advantageous to prepare a uniform ceramic powder having little or no free water therein and to press this powder under high pressure to form shapes which can be fired. For best results, the powder is first mixed with a suspending agent into a slurry or slip, having a consistency somewhat similar to that of slip used in casting pottery, and this slip is spray-dried into tiny rounded pellets. These tiny pellets form a ceramic powder which pours very readily and may be employed to fill a mold cavity completely and uniformly. This obtains the initial uniformity of structure, composition and density. By properly forming the mold of elastic or flexible material and applying hydrostatic pressure to the exterior of the mold, the material in the mold is pressed substantially uniformly. By employing high pressure the body can be compressed sufficiently for handling prior to burning even though containing little or no free water. With some ceramic powders, it is necessary or desirable to add a slight amount of a binding agent as a temporary bond, but, where this is necessary, it is usually desirable to reduce the quantity to the lowest amount which will supply sufficient bond. Therefore, in employing the process outlined, which will be hereinafter referred to as dry-pressing, it is customary to form the initially pressed bodies with the minimum bond that will suffice for subsequent handling operations prior to the burning. This fact, together with the fact that this method is employed where uniformity is especially desirable in the completed article, gives rise to certain difficulties in connection with glazing such articles.

Customarily the glaze is applied by mixing suitable powdered materials with water and coating the suspension upon the surfaces to be glazed. Where glaze is applied in this manner to a dry-pressed article, the water penetrates into the article and develops colloidal properties. This not only weakens the article, but is apt to develop cracks and also irregular shrinking and development of strains in the fired body. The cracking and developed strains found to result are believed to be due to the disrupting force of the water films which form on the grains.

This difficulty can be avoided by employing a suspending medium for the glaze composition of a type which does not develop colloidal properties in clay or other finely divided ceramic material. Almost any liquid which can be used as a suspending medium for the glaze composition is an improvement over water. Turpentine, kerosene, fuel oil, alcohol, carbon tetrachloride, soluble oil in water and diacetone may be mentioned as among the suspending mediums which have been employed with success. In general, it is preferred to employ a medium containing very little, if any, water. However, as will be noted from the list above, considerable amounts of water may be employed in the medium if accompanied by some other liquid, such as soluble oil, which is sufficiently dispersed through the water and which prevents the water from having its normal action upon the ceramic material. Acids and ammonia may be mentioned among the materials which do not seem to mitigate the deleterious effects of the water, but alcohol and diacetone and similar materials as well as soluble oil slow up the action of the water and retard its penetration into the material. It has been found even that certain materials known as wetting agents seem to slow up the penetration of the water into the ceramic material and retard its slaking action thereon.

The invention, therefore, comprises suspending glazing materials in a medium which does not develop the colloidal properties of the body to be glazed, and applying the glaze thus suspended to the body. As pointed out, this is particularly useful in glazing dry-pressed ceramic ware that is but lightly bonded by the compression. From the foregoing, it will be readily understood that the suspending medium may be either completely non-aqueous or may comprise water in combination with a substance which inhibits the slaking action of the water. When such a glaze is applied to a dry-pressed ceramic article, no difficulties are incurred because of penetration of the glaze suspending medium into the body of the article.

The glaze materials may be prepared in any convenient way, one satisfactory way being to grind the glaze materials in the suspending medium.

What I claim is:

1. The method which consists in pressing ceramic powder substantially dry as to free water into a shaped article, suspending glazing materials in a suspending medium which does not develop colloidal properties in the ceramic material, applying a coating of the glaze thus suspended upon the surface of the article and firing the article thus coated.

2. The method which consists in pressing ceramic powder substantially dry as to free water into a shaped article, suspending glazing materials in a non-aqueous suspending medium, applying a coating of the glaze thus suspended upon the surface of the article and firing the article thus coated.

3. The method which consists in pressing ceramic powder substantially dry as to free water into a shaped article, suspending a glaze in a medium of soluble oil and water, applying a coating of the glaze thus suspended upon the surface of the article and firing the article thus coated.

4. The method which consists in forming a ceramic slip, spray-drying the slip into a powder composed of tiny rounded pellets, filling the powder into a cavity of predetermined shape, compressing the powder in the cavity, by hydrostatic pressure, into a shaped article, suspending glazing material in a liquid that does not develop the colloidal properties of ceramic material, applying the suspension to the surface of the article, and firing the coated article.

BENJAMIN A. JEFFERY.